United States Patent [19]

Schultheis et al.

[11] Patent Number: 5,227,610
[45] Date of Patent: Jul. 13, 1993

[54] PROCESS AND DEVICE FOR INDICATING AN ANOMALOUS THERMAL STRESS CONDITION IN A HEATING SURFACE MADE FROM GLASS CERAMIC OR A COMPARABLE MATERIAL

[75] Inventors: Bernd Schultheis, Schwabenheim; Klaus Kristen, Wiesbaden, both of Fed. Rep. of Germany

[73] Assignee: Schott Glaswerke, Mainz, Fed. Rep. of Germany

[21] Appl. No.: 731,772

[22] Filed: Jul. 18, 1991

[30] Foreign Application Priority Data

Jul. 18, 1990 [DE] Fed. Rep. of Germany ....... 4022844

[51] Int. Cl.$^5$ .............................................. H05B 3/74
[52] U.S. Cl. .................................... 219/449; 219/453; 219/506
[58] Field of Search ............... 219/448, 449, 450, 453, 219/506; 374/137, 166

[56] References Cited

U.S. PATENT DOCUMENTS

4,322,594 3/1982 Brisson .................................. 219/506
4,740,664 4/1988 Payne .................................... 219/449

Primary Examiner—Teresa J. Walberg
Attorney, Agent, or Firm—Millen, White, Zelano and Branigan

[57] ABSTRACT

A process for detecting and indicating an anomalous thermal stress condition in a heating surface made from glass ceramic or a comparable material, especially a glass ceramic cooking surface, is described, and by one or more temperature sensors, independent of one another, placed in the area of the heating zone the temperature distribution in the heating surface characteristic for a specific anomalous thermal stress condition is determined and is indicated by suitable operating condition indicators and/or optical and/or acoustic warning devices. This has the advantage that harmful operating conditions caused by carelessness can be indicated to the user early and can be specifically eliminated by the user.

14 Claims, 7 Drawing Sheets

| Operating condition | outer sensor circuit | inner sensor circuit |
|---|---|---|
| Heating element on/boiling with a good pot | $U_a > U_s ==> 1$ | $U_i > U_s ==> 1$ |
| Heating element on/boiling with an inferior pot | $U_a > U_s ==> 1$ | $U_i < U_s ==> 0$ |
| Heating element on/without a pot (pot bottom retracted) | $U_a < U_s ==> 0$ | $U_i < U_s ==> 0$ |
| Heating element on/too small a pot | $U_a < U_s ==> 0$ | $U_i > U_s ==> 1$ |
| Heating element on/improperly placed pot | $U_a < U_s ==> 0$ | $U_i > U_s ==> 1$ |
| Heating element on/boiling with an inferior pot (pot bottom arched outward) | $U_a < U_s ==> 0$ | $U_i > U_s ==> 1$ |
| Heating element on/empty pot placed on cooking zone | $U_a < U_s ==> 0$ | $U_i < U_s ==> 0$ |
| Heating element off | $U_a > U_s ==> 1$ | $U_i > U_s ==> 1$ |

PROCESS AND DEVICE FOR INDICATING AN ANOMALOUS THERMAL STRESS CONDITION IN A HEATING SURFACE MADE FROM GLASS CERAMIC OR A COMPARABLE MATERIAL

BACKGROUND OF THE INVENTION

The invention relates to a process for detecting and indicating an anomalous thermal stress condition of a heating surface made from glass ceramic or a comparable material, in particular a glass ceramic surface, as well as a device for performing the process in a cooking area with a glass ceramic cooking surface.

Heating surfaces made from glass ceramic or a comparable material are used, for example, as wall or ceiling radiators, heat exchangers, or other large-surface heating devices, which can be heated in any way.

Electrically or gas-heated cooking areas or individual burners, whose heating surface consists of glass ceramic, are now of special interest. Cooking areas of this type are generally known and have already been described many times in the patent literature. Heating of the heating zones of these cooking areas takes place in this case by heating elements, placed below the glass ceramic cooking surface, e.g., electrically operated contact heating elements, radiant heating elements or gas burners. Further, induction cooking areas are also known.

In the known household cooking areas, the heat output for the heating elements is permanently adjusted by the presetting of the user or electronically, electromechanically or, with gas stoves by valves, purely mechanically controlled by a selectable time program. Corresponding controls are described, for example, in patent specification DE-PS 3 639 186 A1.

It is known to heat, with several heating elements, cooking zones (without narrowing the meaning, the term cooking zone instead of heating zone is used below in connection with glass ceramic cooking surfaces) of a glass ceramic cooking area, which exhibit a sizable diameter, for example, to heat pots with sizable diameters and/or nonround, for example, oval bottoms. It is also known, besides the permanent heating elements constantly in operation, to use so-called auxiliary heating elements, which are actuated only in the boiling phase, to achieve an accelerated heating of the cooking zone. The geometric arrangement of the heating elements below a heating zone then is usually matched to the geometry of the cookware.

Thus, for example, a hot plate with two heating circuits, concentric to one another, is described in DE-OS 33 14 501 A1, in which the outer heating circuit is designed as an auxiliary heating element.

DE-PS 34 06 604 relates to a heating device, in which the cooking zone is heated by high-temperature and normal-temperature radiant heating elements. The heating elements in this case are placed so that the cooking zone is divided into two zones, concentric to one another, and the inner zone can be heated only by the high-temperature radiant heating elements usable preferably as auxiliary heating elements in the boiling phase and the outer zone by the normal-temperature radiant heating elements. A comparable arrangement of several radiant heating elements in the area of a cooking zone is also to be found in U.S. Pat. No. 4,639,579.

A heating device with a gas burner, which exhibits two burner chambers, independent of one another and able to be actuated with gas, which, e.g., can delimit zones, concentric to one another, in the cooking zone area, is described in U.S. Pat. No. 4,083,355.

In the glass ceramics usually used, the maximum operating temperatures are to be limited to 700° C. To avoid overheating the glass ceramic heating surface, therefore as a rule so-called protective temperature limitation devices, e.g., a bar expansion switch placed between the heating elements and the glass ceramic surface, are used, which usually turn off the heating element completely when a specific maximum temperature is exceeded or reduce its output. After passing through a hysteresis, the full heat output is again turned on. A bar expansion switch, for example, which suitably operates at two different temperatures, is known from DE-OS 3 314 501.

From German patent specification DE-PS 21 39 828, it is known that glass, glass ceramic or similar materials have an electrical conductivity dependent on the temperature, so that temperature-measuring resistances with steep resistance-temperature characteristics, similar to the known NTC resistances, can be produced from them by applying strip conductors, e.g., made from noble metals.

This type of temperature sensors is used for this purpose in DE-OS 37 44 372 in connection with the corresponding wiring, to replace the above-mentioned protective temperature limitation device completely. For this purpose, in each cooking zone two strip conductors each, parallel to one another, which each delimit a strip-like glass ceramic resistance, are applied along a half diameter on the glass ceramic cooking surface.

Experience has shown that anomalous thermal stresses in glass ceramic cooking surfaces result mostly from using inferior cookware or operating errors.

Thus, e.g., in cookware with uneven support surfaces, a locally varying removal of heat takes place in the cooking zone. By carelessness, empty cookware can cause still higher temperature/time stresses for the glass ceramic. Pots with too small diameters as well as inadvertently improperly placed, i.e., pots which are not centered, cause further extreme stresses. In these cases, the cooking zone in the areas not covered by the pot is overheated. The surface temperature of the glass ceramic in such cases can be considerably above the temperatures measured in the operation without a pot. Temperature increases of up to 200 K above the surface temperature in operation without a pot are possible.

These anomalous thermal stresses in the area of the cooking zones can add up to high temperature/time stresses over time and can bring about the destruction of the cooking surfaces. Extremely high temperatures can damage the superposed cookware and also the glass ceramic cooking surfaces. Pot enamel, for example, can melt in the case of steel enamel cookware which is inadvertently placed empty on a glass ceramic cooking surface. Also, aluminum cookware left on the cooking surface while empty can damage the glass ceramic surface by melting aluminum.

Since in practice, both inferior or unsuitable cookware is used and the above-mentioned operating errors occur, the maximum surface temperature in the operation without a pot has to be limited. For the same reason, the specific output density of the heating elements, relative to the surface of the heated zone, is now limited to about 7 watt/cm$^2$.

The known devices for temperature monitoring and limitation have the drawback that as soon as overheating is detected in the area of the temperature sensors, the power supply for the heating elements in the entire cooking zone is interrupted or reduced. This leads to considerably longer boiling periods, although, as, e.g., in the case of an incorrect placement of the cookware, the reason for the anomalous thermal stress condition could be easily eliminated by the user.

SUMMARY OF THE INVENTION

The object of the invention is to find a process for detecting and indicating an anomalous thermal stress condition in a heating surface made from glass ceramic or a comparable material, which not only makes possible a detection and indication of a stress condition as such but also its cause. In particular, the process is to be applicable to cooking areas with glass ceramic cooking surfaces.

Another object of the invention consists in providing a suitable device for performing the process in a cooking area with a glass ceramic cooking surface.

These objects and other objects are achieved in accordance with the process for detecting an anomalous thermal stress condition in glass ceramic heating surface wherein the process comprises the steps of independently monitoring individual temperature sensors in arrays of several temperature sensors placed in selected areas of the glass ceramic heating surface. Upon a thermal anomaly being detected in any one of the selected areas, a signal is generated indicating the occurrence of the anomaly.

In accordance with a specific embodiment of the process, the heating surface is circular and a first array of temperature sensors is positioned proximate the center of the heating surface with a second array of temperature sensors positioned proximate the periphery of the heating surface with the first and second arrays monitored independently.

In accordance with an arrangement for detecting and indicating an anomalous thermal stress condition in a circular glass ceramic heating surface having a center and periphery, the heating surface has a first array of temperature sensors positioned proximate the center thereof and a second array of temperature sensors positioned proximate the periphery thereof. The first and second arrays are monitored independently and a signal indicative of temperatures at the center or periphery of the heating surface exceeding a predetermined temperature level is generated.

In accordance with a preferred embodiment of the arrangement, the arrays of temperature sensors each comprise a plurality of separate resist developments connected in parallel between a pair of conductors.

The invention makes use of the fact that, depending on the use of a heating surface, specific causes for anomalous thermal stress conditions, e.g., typical operating errors always recur. For such known stress cases, the temperature distribution occurring in the heating surface, i.e., in particular the location of overheatings, is easily predictable.

This can be demonstrated in a simple way by the example of the most interesting use of a heating surface as a cooking surface in a cooking area.

Since both the heating zones, i.e., the cooking zones, of a cooking surface and the support surfaces of the cookware usually have circular geometry, in the initially mentioned stress cases typical for cooking areas, such as, e.g., improper positioning of the pot, inferior pot quality, etc. as is also stated below, overheating of the cooking surface occurs only in an inner or only in an outer area respectively of the cooking zone or else in both areas together.

Thus, e.g., with an improper positioning of the pot as well as with a pot with an outward arched supporting surface, only an outer circular edge area of the cooking zone, or only a segment of this area, is overheated.

An inward arched pot bottom or too small a pot lead to an overheating of the central area of the cooking zone, while cookware placed empty on the cooking surface or the absence of cookware results in the overheating of the entire cooking zone.

The process according to the invention therefore provides for determining by several temperature sensors—independent of one another, placed in the area of the heating zone—the temperature distribution characteristic for a specific anomalous thermal stress condition in the heating surface and for indicating it by suitable operating condition indicators and/or optical and/or acoustic warning devices.

The processing of the temperature-measuring signals to control signals for the indicating and/or warning devices takes place with the help of electronic circuits, known in the art, preferably comparator circuits, which compare the temperature-measuring value of a sensor with a specified threshold temperature and produce a control signal for the indicating and warning devices if the threshold temperature is exceeded, i.e., if a local overheating is detected.

In the simplest case, each sensor is assigned exactly one optical or acoustic indicating device which indicates to the user local overheating in the partial area of the heating zone monitored by the sensor. From the combination of the temperature-measuring signals of all sensors, the user can then make a decision on the temperature distribution in the entire heating zone area and thus on the possible cause of the anomalous thermal stress.

But suitable logic circuits downstream from the comparator circuits are preferred which are designed so that by comparison of the measuring signals delivered by the individual temperature sensors and evaluated by the comparator circuits they independently detect the temperature distribution in the heating zone area and assign to it a known anomalous thermal stress condition.

Temperature sensors, independent of one another in the meaning of this invention, for example, can be electromechanically operating temperature sensors with several circuit contacts, independent of one another, such as, for example, the known bar expansion switches, for example, in the form of capillaries with a molten salt filling, with several, but at least two, switching contacts, independent of one another. In this case, the switching contact, which limits the maximum surface temperature, should advantageously respond at a temperature which is at least 10 K over the switching temperatures of the other switching contacts, with whose help the output reduction is performed.

As temperature sensors, heat-conducting rods or sheets or the like also can be used to which the actual temperature sensor is coupled outside the heating element or the heated zone.

In cooking areas with cooking zones with basically circular geometries, with the help of bar expansion switches, which are placed along a half-diameter or diameter of the cooking zone, most of the known anomalous stress cases, namely those which lead to a radially symmetric temperature distribution in the cooking zone area, can be detected completely. But locally occurring temperature peaks cannot be detected in this manner. Moreover, the temperature monitoring is only indirectly possible, since the bar expansion switch has no direct contact with the glass ceramic underside, since it is placed only in the space between the heat source and the glass ceramic underside.

A surface-covering temperature monitoring, for example can be achieved with temperature sensors, which consist of thermoelements placed grid-like in the area of the heating zone or other suitable temperature sensors. To assure a sufficient thermal contact with the heating surface, the sensors have to be pressed on the heating surface. Such temperature sensors can also be integrated in the heating surface. Thus, for example, thermoelements can also be embedded or rolled in the heating surface.

In particular, temperature sensors, integrated in the heating surfaces, are known from DE-PS 21 39 828, are suitable which consist of glass ceramic temperature-measuring resistances limited by two strip conductors each run in parallel, and the strip conductors are applied by silk-screen printing or other methods in a suitable arrangement on the glass ceramic underside and are then baked in. The very greatly temperature-dependent electrical resistance of glass ceramic enclosed between the strip conductors in this case represents the actual temperature-measuring resistance.

With this method, large-surface temperature sensors, which allow a surface-covering temperature monitoring, can be achieved in a simple way. Thus, for example, large-surface heat radiators and heat exchangers with heating surfaces made from glass ceramic, glass or similar materials also can be monitored.

The geometric arrangement of the strip conductors in the area of a heating zone is suitably matched to the geometric arrangement of the heating elements as well as to the expected temperature distribution in known anomalous thermal stress cases.

BRIEF DESCRIPTION OF THE DRAWINGS

Various other objects, features and attendant advantages of the present invention will be more fully appreciated as the same becomes better understood when considered in conjunction with the accompanying drawings, in which like reference characters designate the same or similar parts the several views, and wherein.

DETAILED DESCRIPTION

Figure 1:
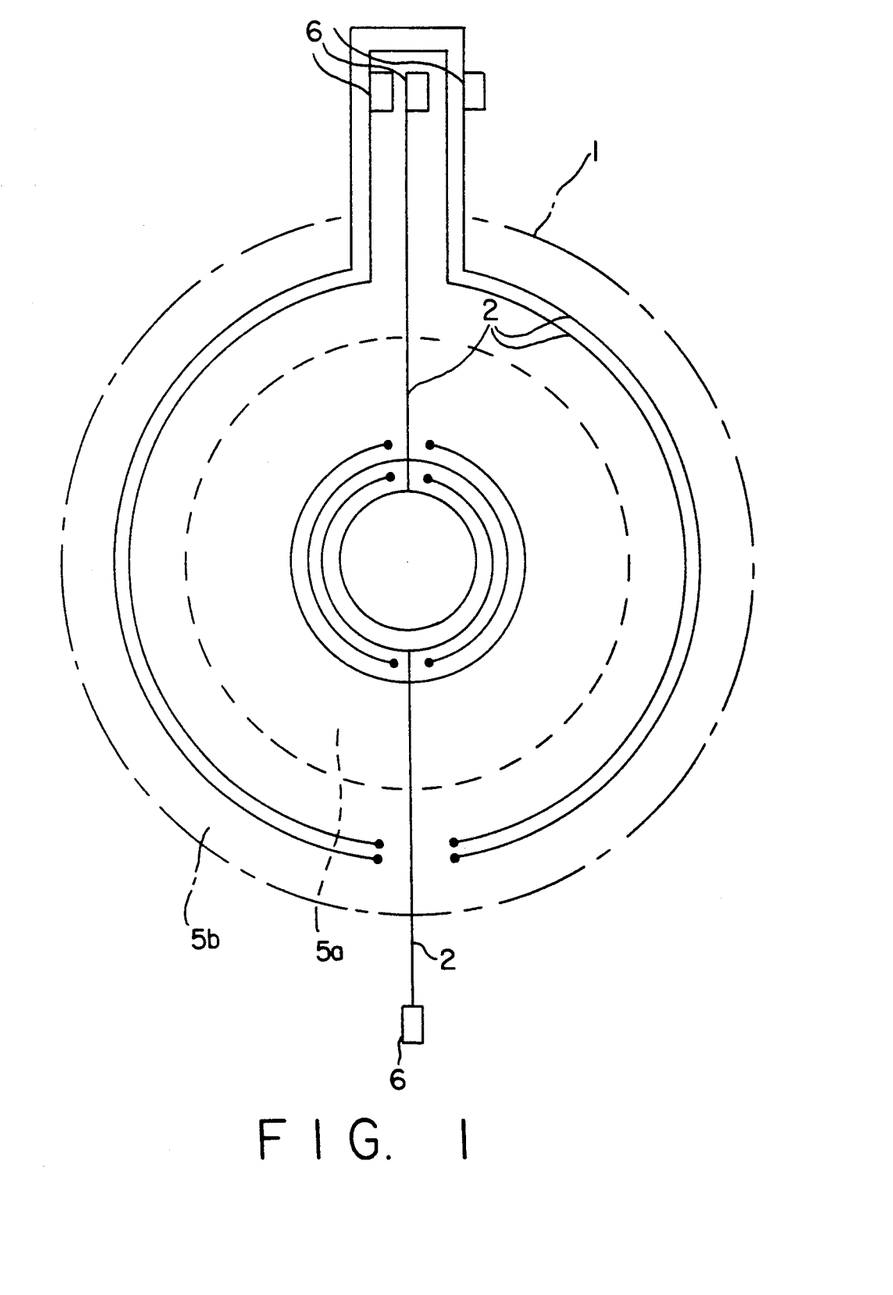
FIG. 1, in a diagrammatic representation, is a device to perform the process according to the invention in a household cooking area with a glass ceramic cooking surface, and two circular temperature sensors, placed concentrically to one another, monitor the central and edge area of a cooking zone.
Figure 2:
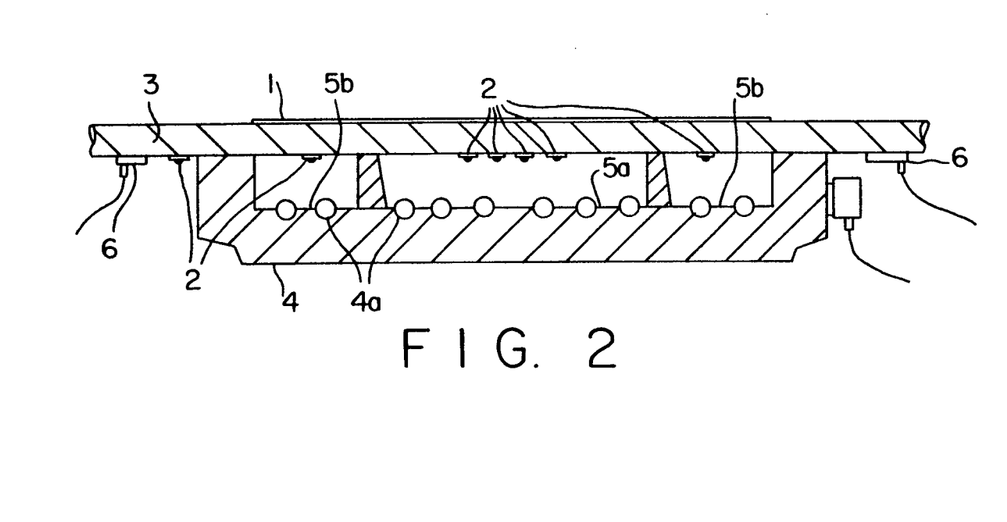
FIG. 2 is the device of FIG. 1 in a longitudinal section representation.

FIGS. 1 and 2 show, by way of example, a preferred device for performing the process according to the invention in a household cooking area with a glass ceramic cooking surface.

Two pairs of strip conductors (2), e.g., made from gold, are placed on the glass ceramic underside inside a cooking zone (1) with circular geometry. The strip conductors each limit strip-like temperature-measuring resistances according to DE-PS 21 398 28. Without narrowing the meaning, a cooking zone with a dual circuit heating element (4), known in the art, placed below glass ceramic plate (3), with an inside circuit (5a) and an outside circuit (5b), is represented in FIGS. 1 and 2.

But the type of heating, i.e., the type of heating elements, its number and geometric arrangement in the area of the cooking zone, is insignificant for the performance of the process according to the invention.

It is seen in the figures that running of strip conductors (2) in cooking zone (1) is selected so that a circular temperature sensor each is placed in the central area and in the edge area, and connecting areas (6) of strip conductors (2) are placed outside cooking zone (1) for protection from temperature stresses.

Because of the simple geometry of the temperature distribution in the cooking zone, it is generally sufficient in one of the known anomalous thermal stress conditions to monitor the entire cooking zone area with only one temperature sensor each in an outer area and an inner area of the cooking zone, since only the temperature difference between the edge area and the central area of the cooking zone is important to detect the stress condition. But since, e.g., with an incorrect placement of the pot, local overheatings may occur in only one segment of the edge area, it has to be guaranteed that all points essential for a stress case be detected by the temperature sensor arrangement. This is assured in a simple way in the circular strip conductor arrangements represented in the figures. But it can also be advantageous to place several circular temperature sensors, concentric to one another, in the area of a cooking zone, so that temperature peaks, e.g., by heater filament loops or, with gas heating, by flame peaks can also be detected and indicated. These temperature peaks have to be detected, since otherwise the heating surface can be damaged at these points.

In several simple cases, it is often sufficient to monitor only the central area or only the edge area of the cooking zone, so that overheating occurring there can be indicated. In these cases, it is provided to place a temperature sensor only in one of the two areas.

Strip conductors (2) cover only a small part of the cooking zone. Strip conductor widths of less than 3 mm are preferred. In this case, the strip conductors are 1-2 mm wide, so that the overall surface of the strip conductors relative to the surface of the heated zone is small. Thus an influencing of the total heat flow is minimized. The surface resistance of these strip conductor layers is less than or equal to 50 m Ω/ at layer thicknesses under 1 micron.

Two temperature sensors, independent of one another, which separately monitor the two areas of the cooking zone, are thus obtained. Analogously to the above-described arrangement, the strip conductor arrangement matched to the respective contours or geometries is selected for other, nonround cooking zones, with which the individual cooking zone areas can be monitored separately.

Strip conductors (2) run in parallel inside cooking zone (1) delimit narrow circular or linear temperature-measuring zones, in which the glass ceramic volumes enclosed by the strip conductors are used as temperature-dependent resistance. The electrical conduction of the glass ceramic, as with glasses, is based on the ionic conduction. The dependence is described by the law of Rasch and Hinrichsen:

$$R = a * \exp(b/T) \quad \text{(eq. 1)}$$

R is the specific resistance of the glass ceramic in ohm*cm at absolute temperature T in kelvins.

a and b are constants dependent on the geometry of the strip conductors and on the glass ceramic (a in ohm*cm and b in K).

The temperature coefficient of these measuring resistances is negative. It is very dependent on temperature and is 3.3%/°C., e.g., for glass ceramics of the $SiO_2$-$Al_2O_3$-$Li_2O$ system at 300° C.

The overall electrical resistance of such an arrangement consists of any number of differential resistances, connected in parallel, with negative temperature coefficients, and can be expressed by the following equation:

$$1/R = 1/R_1(T) + 1/R_2(T) + \ldots + 1/R_i(T) + \ldots 1/R_n(T) \quad \text{(eq. 2)}$$

The temperature-dependent resistance of each differential resistance $R_i(T)$ can be expressed by the following equation:

$$R_i(T_i) = l_i/A_i * a * \exp(b/T_i) \quad \text{(eq. 3)}$$

in which $l_i$ represents the length in cm and $A_i$ represents the cross section surface in $cm^2$ of each differential glass ceramic resistance. Constants a and b are constants dependent on the geometry of the strip conductors and on the glass ceramic (a in ohm*cm and b in kelvins). $T_i$ is the absolute temperature of each differential resistance in kelvins.

The overall electrical resistance is determined by the lowest resistance at the point of the highest temperature of the sensor zones, from which an automatic indication of the maximum temperature results in the respective sensor zone. High temperatures occurring locally cause one or more differential resistances to become low-ohmic, relative to the other differential resistances, which are in colder zones, so that the overall resistance of a sensor according to eq. 2 becomes very low.

Figures 3A, 3B:
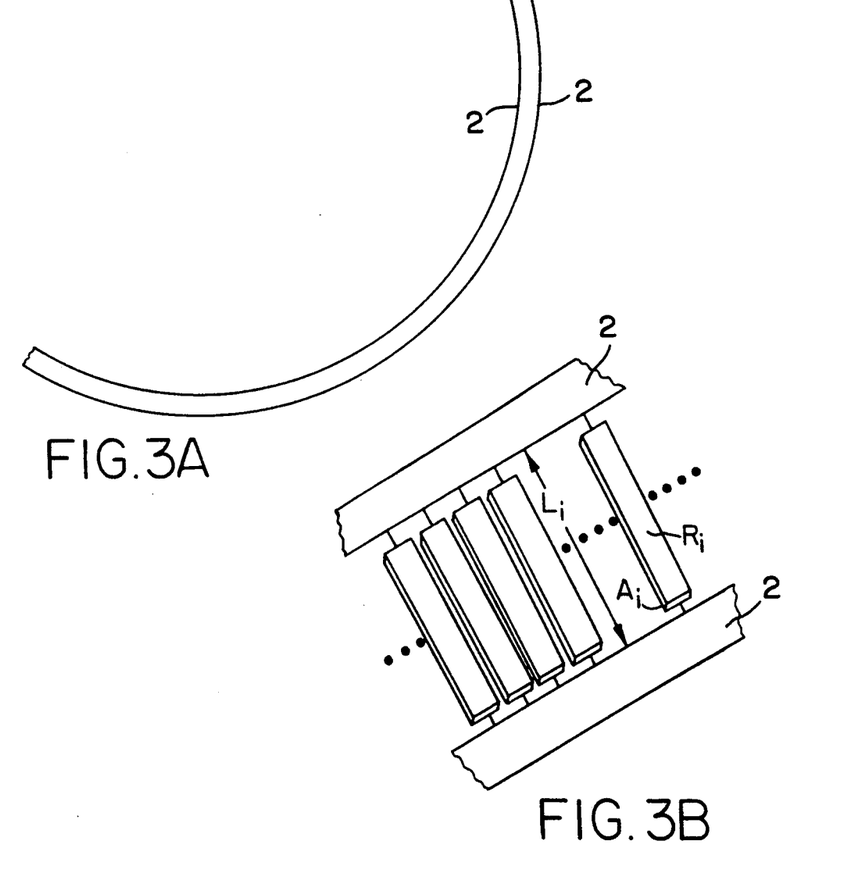
FIGS. 3A and 3B illustrate the method of operation of a glass ceramic temperature-measuring resistance in a diagrammatic representation, an enlarged cutout of an arrangement of two strip conductors, running parallel, with intervening glass ceramic resistance is shown.

For illustration, FIGS. 3A and 3B diagrammatically show a cutout of the opposite strip conductors (2). The intervening enclosed glass ceramic can be viewed as a parallel circuit of many temperature-dependent, differential resistances.

At low temperatures, this arrangement according to eqs. 2 and 3 has a very high resistance. At higher temperatures, for example, the typical temperatures which are measured in the operation without a pot, the resistance decreases several orders of magnitude. Also, the resistance decreases considerably if high temperatures occur only in a small area of the glass ceramic, e.g., with improperly shifted pot. A temperature equalization between adjacent zones, which have varying temperatures, hardly occurs because of the low heat output in glass, glass ceramic or similar material with a λ of typically less than 2 W/mK.

The reaction of the temperature-dependent conductivity change of the glass ceramic in a measuring signal can be achieved in a voltage divider supplied with ac voltage, in which a resistance is formed by the temperature-dependent resistance of the sensor surfaces. The fixed resistances of the voltage divider, dependent on the sensor geometry, have to be selected to that at temperatures which exceed the permissible temperature/time stress, signal changes, sufficient for further processing, can be taken off the voltage divider. The temperature range, in which the greatest signal deviation occurs, can be changed by matching the fixed resistances. The fixed resistances are simultaneously used for the current limitation.

The ac voltage is necessary to avoid polarization effects of the glass ceramic and the associated electrochemical decomposition because of the ionic migration. Frequencies which are in the range between 50 Hz and 1,000 Hz are preferred for the applied ac voltage.

Figure 4A:
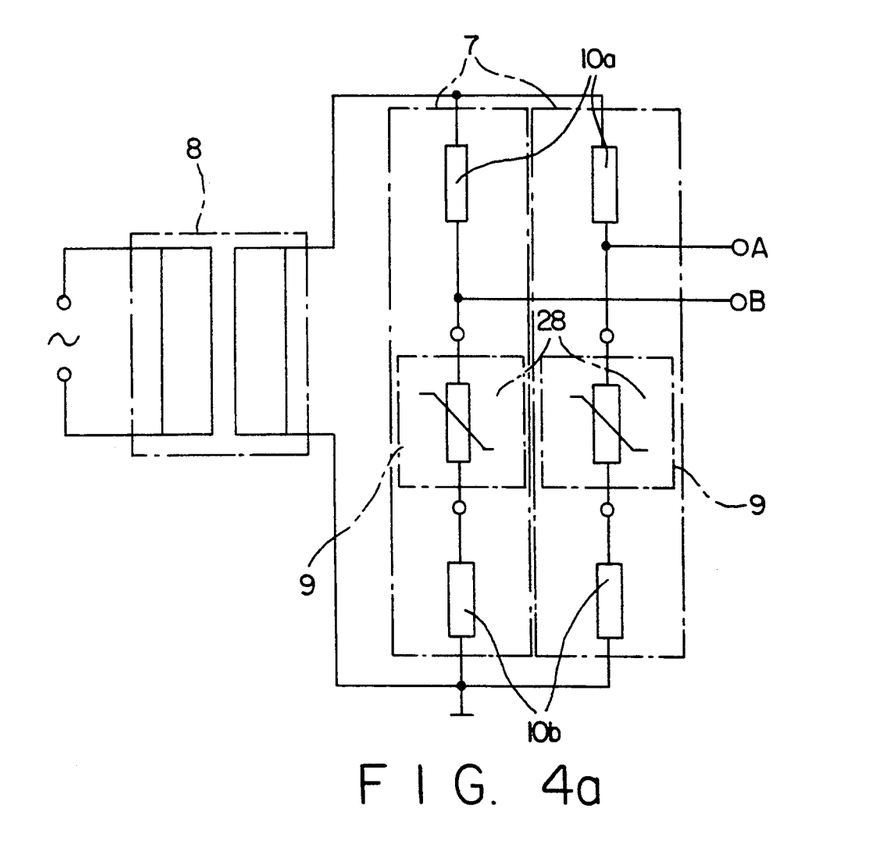
FIG. 4a a diagrammatic circuit arrangement for the temperature sensors of FIG. 1 used to adjust the temperature area with greatest measuring sensitivity.

FIG. 4a diagrammatically shows the circuit arrangement according to the invention, and a voltage divider (7) each is represented for each temperature sensor. Both voltage dividers are supplied by an ac voltage source, (8), represented here as a transformer. Thus, it is guaranteed that direct current does not flow through the glass ceramic, represented here as a temperature-dependent resistance (9). Both fixed resistances (10a) and (10b) were selected so that a great signal change occurs in the range of 500° to 600° C. This temperature range is characteristic for the surface temperatures occurring in practice within cooling zones (1) of glass ceramic cooking areas.

The ac voltage signal applied to the voltage divider is rectified by a rectifier circuit and is fed to a suitable electronic circuit. Preferably these are operational amplifiers, which are connected as comparators. But also other circuits and components known from electronics, such as microprocessors or the like, can be used.

The signals delivered by the sensors are processed in these circuits so that on its output, a signal is available with which indicating and/or warning devices can be controlled.

Figure 4B:
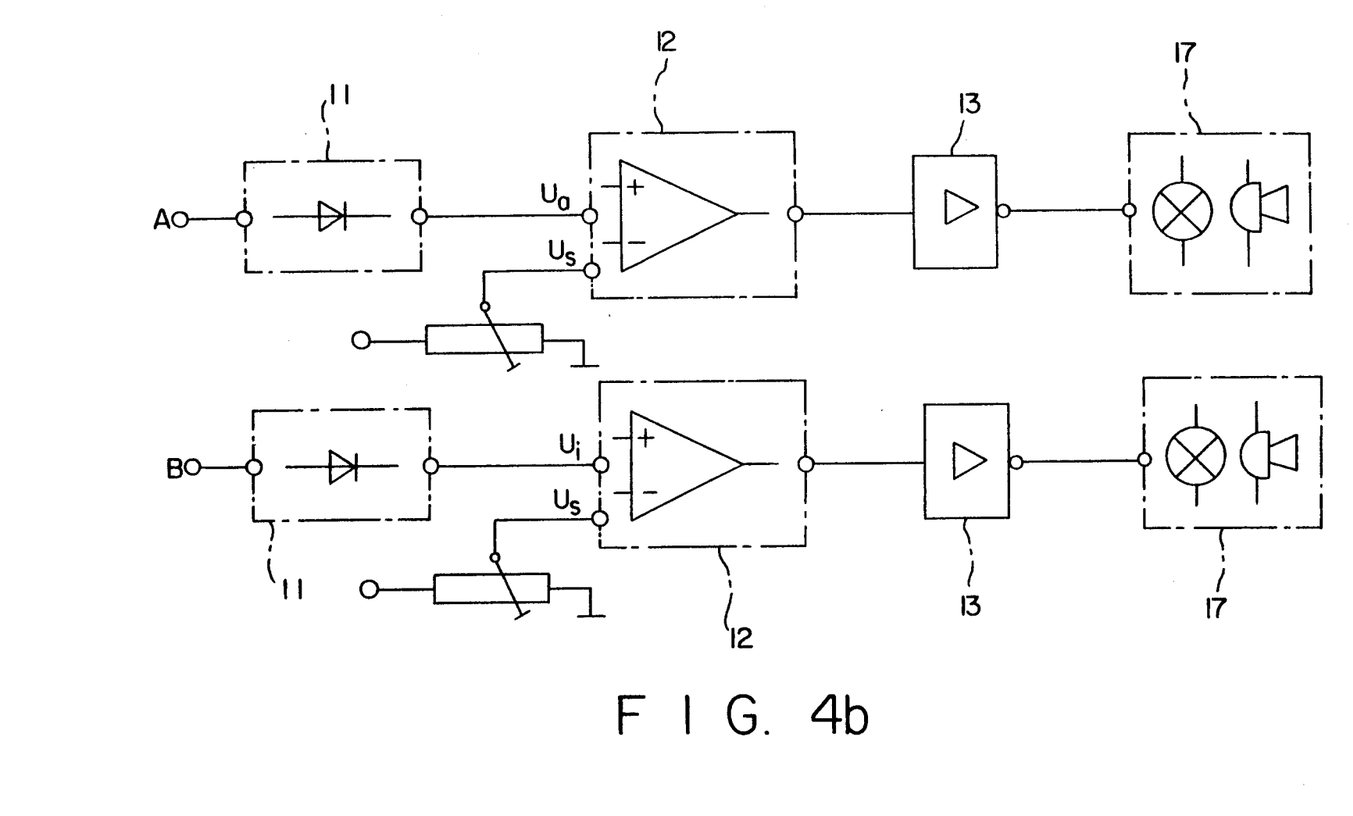
FIG. 4b is a comparator circuit, known in the art, to evaluate the temperature-measuring signals delivered by the temperature sensors with a downstream inverter to indicate anomalous temperatures.

In the arrangement in FIG. 4b, the signal taken from voltage divider (7) is fed by a rectifier circuit (11) to the input of an operational amplifier (12) connected as a comparator. The comparator has the task to compare the temperature-dependent signal originating from the sensor arrangement with a fixed, set voltage value, the threshold voltage Us in FIG. 4b. If the voltage from the sensor is above the threshold voltage, which would be the case in this arrangement at comparatively low temperatures, e.g., by using good cookware, the output of the comparator is put through. This signal is fed by an inverter (13) of indicating or warning device (17).

In the case of falling short of the threshold voltage with increasing temperature, the output of comparator (12) switches to negative potential. By inverting this signal, the optical and/or acoustic warning device is switched.

In practice, this has the following effects:

By using good cookware, the surface temperature of the glass ceramic both in the outside area and the inside area remains below a temperature corresponding to the threshold voltage. The outputs of both comparators have a positive potential.

In inferior cookware with a retracted bottom, the glass ceramic, because of the inferior removal of heat heats up considerably more under the pot bottom in the central area of the cooking zone than in the edge area, since in the edge area, the glass ceramic is in contact with the pot bottom. Consequently, the output of the comparator assigned to the central area has negative potential, the output of the comparator assigned to the edge area has positive potential. Then, an overheating is indicated in the central area.

In the also possible stress case of "arched outward pot bottoms," "improperly placed pot" or "too small a pot" the edge area of the cooking zone is heated more than the central area, so that the above-described conditions are precisely reversed.

For the case that an empty pot is placed on the cooking zone, the temperature of the glass ceramic increases greatly in the central and edge area. In this case, both comparator outputs have positive potential. Overheating of the entire cooking zone is detected.

Figure 5:
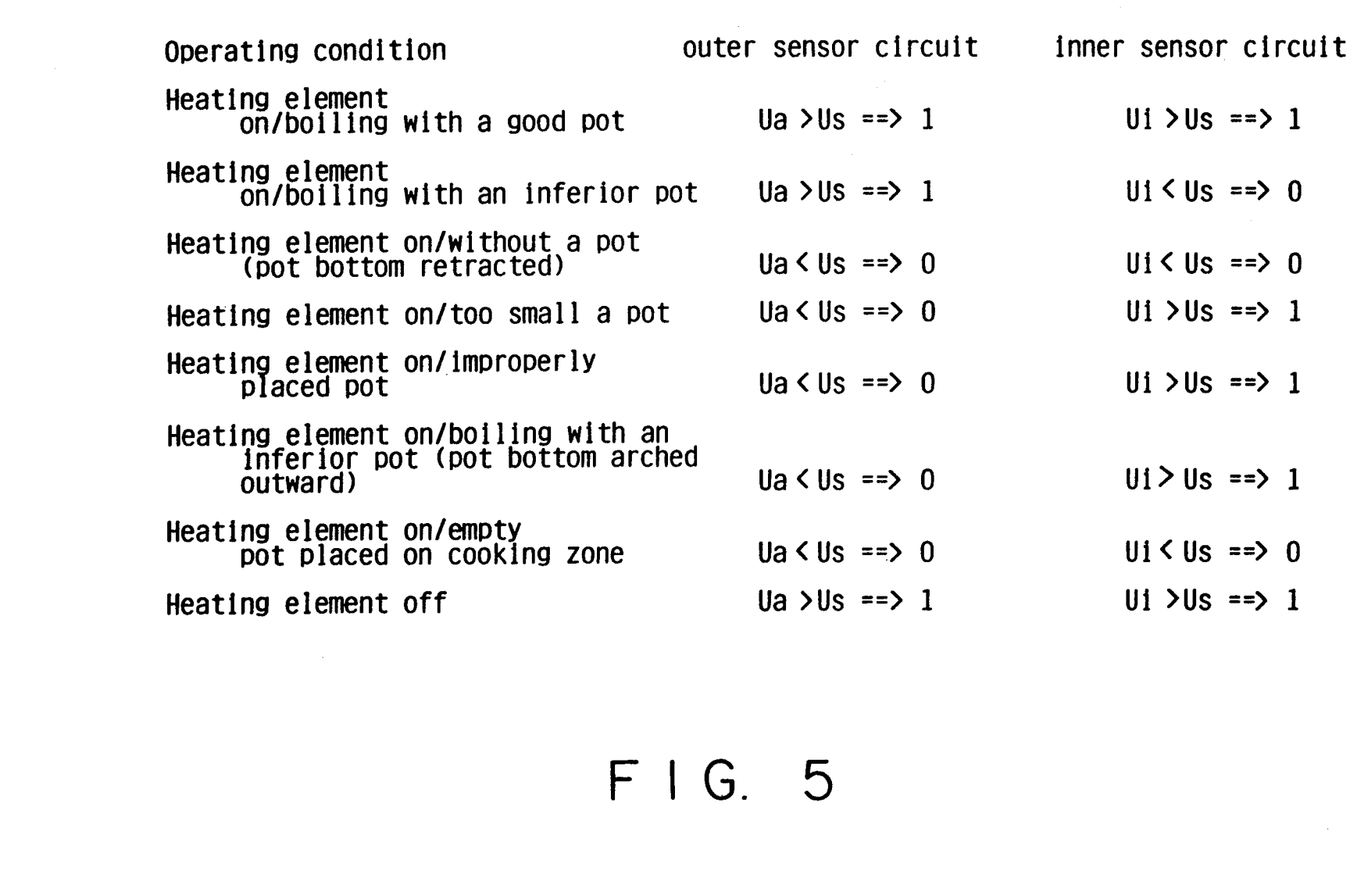
FIG. 5 shows the temperature-measuring signals for the anomalous thermal stress conditions, occurring most often in glass ceramic cooking surfaces, and the corresponding operating condition indicators.

In FIG. 5, the operating conditions and their effect on the circuit are compiled in tabular form from FIGS. 4a and 4b.

Figure 6:
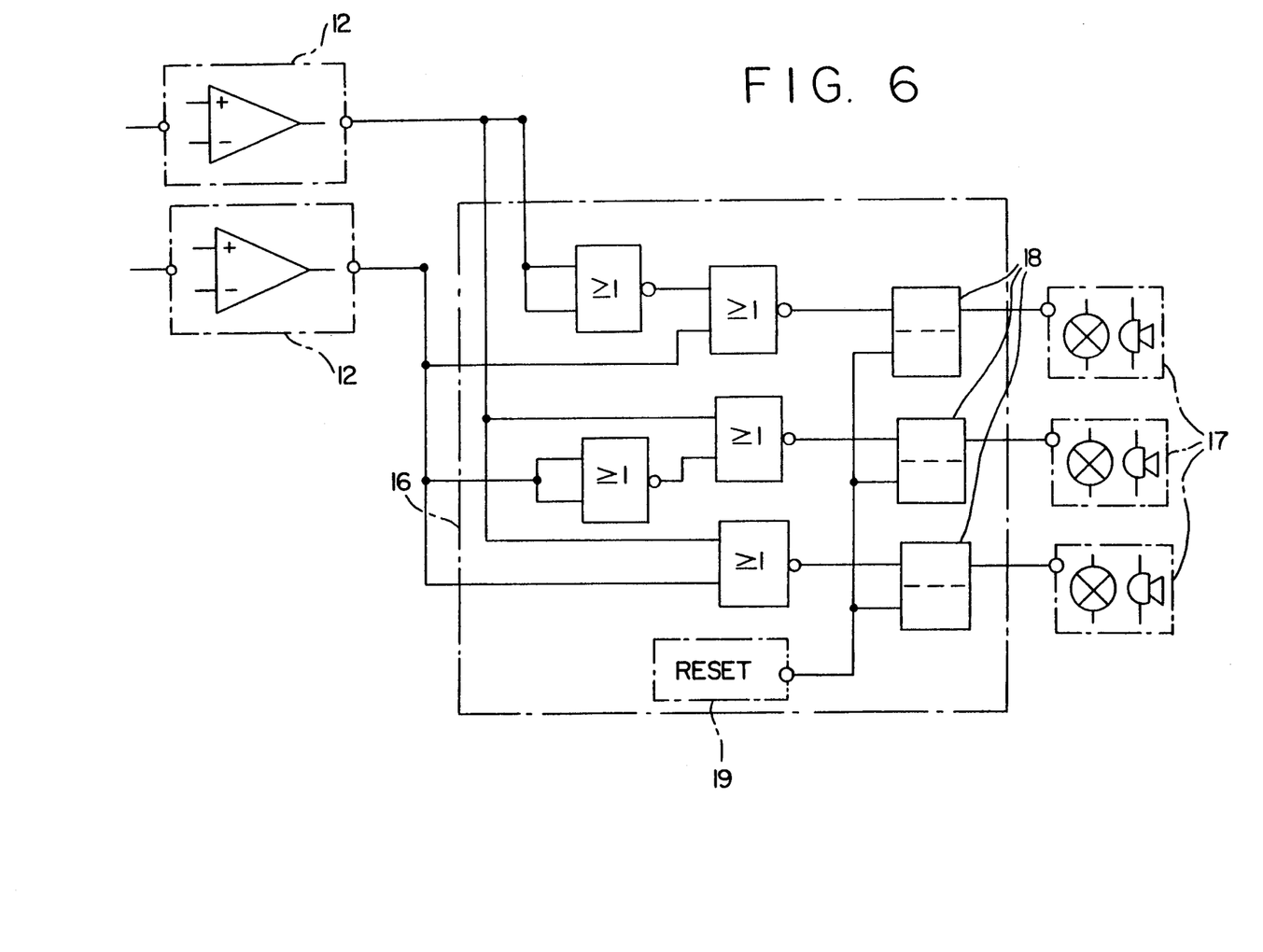
FIG. 6 illustrates a logic circuit for independent detection and indication of an anomalous thermal stress condition.

With the sensor signals, a logic circuit (16) can be achieved in a quite simple way, as diagrammatically represented in FIG. 6, with which a pot quality detection is made possible. Suitable logic circuits can be designed, for example, from NOR or NAND gates and/or microprocessors.

Also, the operating conditions caused by carelessness and operating errors can be detected with such a logic circuit, and indicated optically or acoustically to the user (17). A timing of the indicators is avoided, if, for example, the operating condition indicator is stored by a flip-flop circuit (18). When the heating element is turned-off, the operating indicators can be reset by a suitable reset circuit (19).

The advantages achievable with the invention are especially that operating conditions caused by carelessness are detected with the above-described system and are indicated to the user. As a result, the reliability is decisively improved. In addition, an energy-saving effect is achieved in that operating conditions are indicated early to the user in which the efficiency of the cooking system, e.g., by using inferior quality pots or pot sizes not matched to the heating element size, is low.

The entire disclosures of all applications, patents and publications, cited above and below, and of corresponding application Federal Republic of Germany P 40 22 844.4, filed Jul. 18, 1990, are hereby incorporated by reference.

From the foregoing description, one skilled in the art can easily ascertain the essential characteristics of this invention, and without departing from the spirit and scope thereof, can made various changes and modifications of the invention to adapt it to various usages and conditions.

We claim:

1. A process for detecting and indicating an anomalous thermal stress condition in a heating surface made of glass ceramic including the steps of:
   determining a characteristic temperature distribution in the heating surface for a specific anomalous thermal stress condition by monitoring a plurality of temperature sensors, independent of one another, placed in the area of a heating zone and indicating the condition by operating condition indicators.

2. The process according to claim 1, wherein temperature-measuring signals, delivered by the individual temperature sensors, are fed to comparator circuits which produce control signals from the temperature-measuring signal for the indicating and warning devices only when a preset threshold temperature is exceeded.

3. The process according to claim 1, further including comparator circuits which produce signals wherein the signals produced by the comparator circuits are fed to suitable logic circuits which automatically assign a specific anomalous thermal stress condition to a measured temperature distribution in the heating zone area.

4. The process according to claim 1, wherein the temperature in central and edge areas of the cooking zone is measured separately when a glass ceramic cooking surface is involved.

5. The process according to claim 1, wherein the temperature-dependent, electrical resistance of the heating surface material is determined as a relevant value for the temperature of the heating surface.

6. A device for detecting and indicating an anomalous thermal stress condition in a cooking area with a glass ceramic cooking surface having at least one cooking zone, comprising:
   at least one temperature sensor in an edge area of the cooking zone,
   at least one other temperature sensor in a central area of the cooking zone,
   the temperature sensors producing temperature measuring signals in the edge area and in the central area being independent of one another and being placed so that in each case all spots essential for a case of stress in the cooking zone are detected,
   electronic circuit means for evaluation of the temperature-measuring signals, and
   operating condition indicators connected to the electronic circuit means for indicating the operating condition determined by the temperature sensors.

7. The device according to claim 6, wherein the electronic circuits are comparator circuits.

8. The device according to claim 6, wherein the electronic circuit means includes comparator circuits and wherein logic circuits are connected downstream from the comparator circuits, which logic circuits automatically assign a known anomalous thermal stress condition to a measured temperature distribution.

9. The device according to claim 6, wherein the temperature sensors cover narrow circular areas, concentric to one another, in the cooking zone.

10. The device according to claim 6, wherein the temperature sensors are glass ceramic temperature-measuring resistances in the glass ceramic cooking surface delimited and bonded by strip conductors which run parallel to one another.

11. A process for detecting and indicating an anomalous thermal stress condition in a glass ceramic heating surface comprising the steps of:

independently monitoring individual temperature sensors in arrays of several temperature sensors placed in selected areas of the glass ceramic heating surface, and upon detecting a thermal anomaly in any one of the selected areas generating a signal indicative thereof.

12. The process of claim 11, wherein the heating surface is circular and wherein a first array of temperature sensors is positioned proximate the center of the heating surface and a second array of temperature sensors is positioned proximate the periphery of the heating surface and wherein the first and second arrays are monitored independently.

13. An arrangement for detecting and indicating an anomalous thermal stress condition in a circular glass ceramic heating surface having a center and a periphery comprising:

a first array of temperature sensors positioned proximate the center of the heating surface;

a second array of temperature sensors positioned proximate the periphery of the heating surface;

first means monitoring the first array of temperature sensors for providing a first signal if the temperature proximate the center of the heating surface exceeds a predetermined temperature level, second means monitoring the second array of temperature sensors for providing a second signal if the temperature proximate the periphery of the heating surface exceeds the predetermined temperature level; and indicating means, connected to the first and second monitoring means, for generating a signal indicating that either the first or second monitoring means has detected a temperature in excess of the predetermined temperature level.

14. The arrangement of claim 13, wherein the arrays of temperature sensors each comprise a plurality of separate resistive elements connected in parallel between a pair of conductors.

* * * * *